United States Patent [19]

Angi et al.

[11] Patent Number: 4,665,350
[45] Date of Patent: May 12, 1987

[54] OPEN-LOOP BRUSHLESS MOTOR CONTROL SYSTEM

[75] Inventors: Donald F. Angi, Dayton, Ohio; Kevin G. Connors, Boston, Mass.; Richard N. Lehnhoff, Kettering; Jack W. Savage, Centerville, both of Ohio

[73] Assignee: General Motors Corporation, Detroit, Mich.

[21] Appl. No.: 825,607

[22] Filed: Jan. 31, 1986

[51] Int. Cl.$^4$ .............................................. H02P 6/02
[52] U.S. Cl. .................................... 318/254; 318/138; 318/439; 318/696
[58] Field of Search ............... 318/138, 254, 439, 599, 318/696

[56] References Cited

U.S. PATENT DOCUMENTS

| | | | |
|---|---|---|---|
| 4,258,299 | 3/1981 | Takeda et al. | 318/138 X |
| 4,368,411 | 1/1983 | Kidd | 318/599 X |
| 4,528,486 | 7/1985 | Flaig et al. | 318/254 |
| 4,546,293 | 10/1985 | Peterson et al. | 318/254 |
| 4,583,028 | 4/1986 | Angersbach et al. | 318/254 |

Primary Examiner—William M. Shoop, Jr.
Assistant Examiner—Bentsu Ro
Attorney, Agent, or Firm—Mark A. Navarre

[57] ABSTRACT

The speed command for an open-loop brushless motor speed control system is overridden whenever the speed of the motor is less than a relatively low reference speed in order to quickly accelerate the motor to a running speed, despite a relatively low speed command. In the event of a motor overcurrent condition, the override is itself overridden to protect the controller.

4 Claims, 5 Drawing Figures

OPEN-LOOP BRUSHLESS MOTOR CONTROL SYSTEM

This invention relates to a controller for operating a brushless DC motor, and more particularly to an open-loop speed controller having control features which permit reliable low speed starting of the motor.

Due to reductions in the cost of power electronics, electronically commutated brushless DC motors are increasingly being used in place of conventional brush-type DC motors, especially in applications requiring variable speed control. In a brushless DC motor, the rotor field is generated with permanent magnets, and the stator field is generated by sequentially energizing a plurality of stationary stator windings. A rotor position sensor and logic circuit provide the commutation function. As with a brush-type DC motor, speed control of a brushless DC motor is generally achieved by controlling the duty cycle of the stator winding energization. The motor torque, and therefore speed, increases as the energization duty cycle is increased.

In motor speed control, there are essentially two approaches: open-loop and closed-loop. This invention concerns open-loop speed control—that is, a system in which the motor windings are energized at a predetermined duty cycle in response to a signal indicative of the desired motor speed. This approach is simpler than closed-loop control, and is most useful in applications where the load is constant or at least predictable as in the case of an automotive ventilation blower. However, the lowest running speed available with conventional open-loop speed control is limited by the torque required for reliable starting. In addition, provision must be made for sensing a stall or locked rotor condition and taking appropriate action.

This invention provides improved open-loop speed control for a brushless DC motor which overcomes the disadvantages of conventional open-loop control as described above. In particular, a predetermined and relatively low motor speed is defined and compared with an indication of the actual motor speed. Whenever the actual motor speed is below the predetermined speed, an override circuit is enabled, causing the desired speed signal to be ignored and the energization duty cycle to be progressively increased to effectively command relatively high motor speed. This feature ensures reliable motor starting at relatively low desired speeds, and thereby extends the usable speed range of the motor.

When the actual motor speed exceeds the predetermined speed, the override is disabled and the energization duty cycle is once again controlled in response to the desired speed signal as in conventional open-loop control. A current limit circuit cooperates with the override circuit and independently reduces or interrupts the winding energization to protect the motor from damage if the actual motor speed fails to exceed the predetermined speed.

Figure 1:
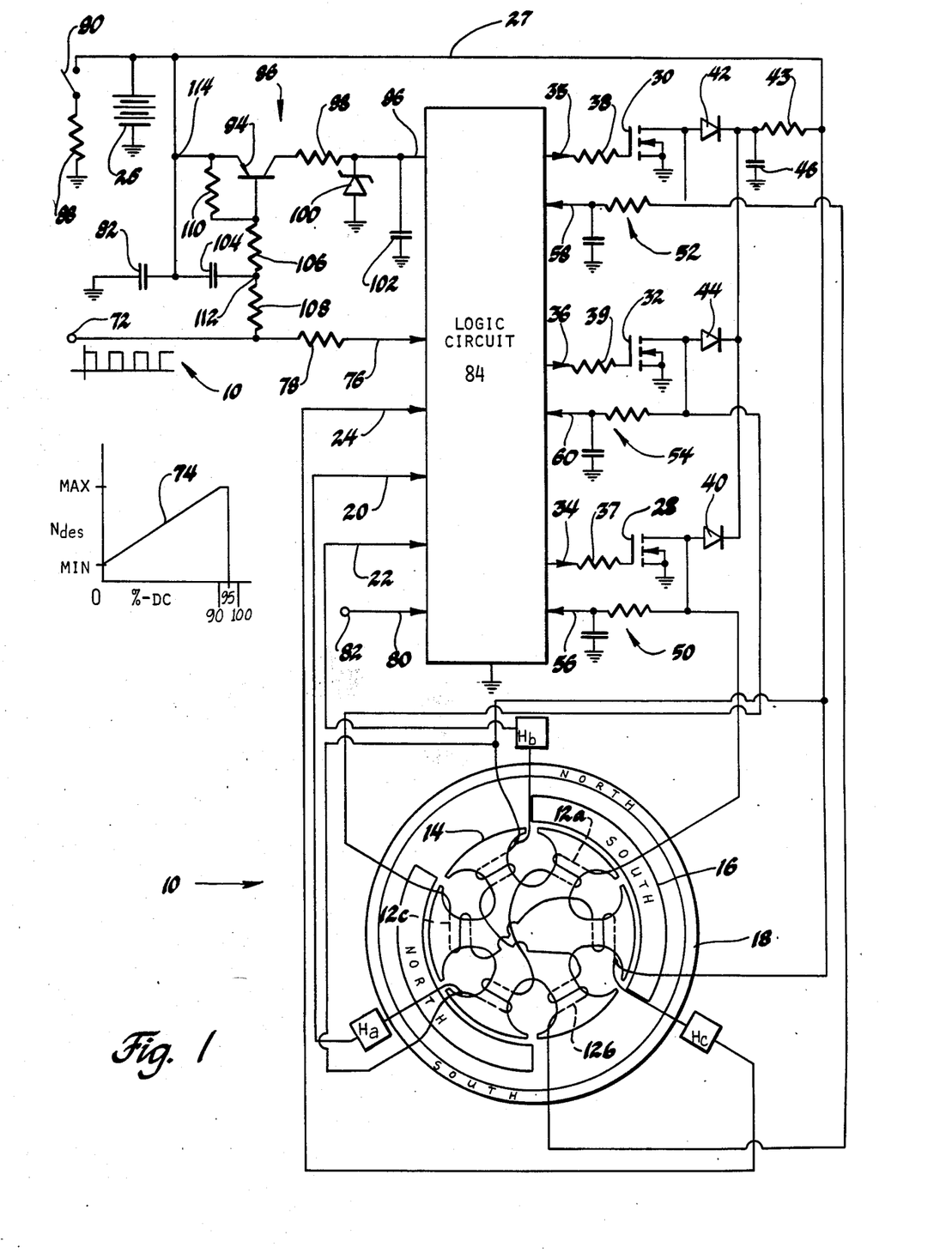
FIGS. 1–2 form a schematic circuit diagram of a battery operated brushless DC motor and controller according to the teachings of this invention.

Referring now to the drawings, and more particularly to FIG. 1, reference numeral 10 generally designates a brushless DC motor comprising three WYE-connected phase windings 12a, 12b, and 12c wound on a stationary six-pole stator core 14, and a two-pole permanent magnet rotor 16 disposed thereabout. The rotor 16 also carries a two-pole phasing magnet 18 which cooperates with three stationary and equally spaced Hall-Effect devices $H_a$, $H_b$, and $H_c$ to provide rotor position information on the lines 20, 22, and 24.

The phase windings 12a–12c are adapted to be energized with current from an automotive storage battery 26 via line 27 and a three-phase half-wave inverter comprising three power MOSFET transistors 28, 30 and 32. As will later be explained, the conduction of the power transistors 28, 30, and 32 is controlled via the lines 34–36 and the resistors 37–39 in accordance with the rotor position information on lines 20, 22, and 24 to produce positive motor torque for advancing the rotor 16 in the desired direction. To protect the transistors 28–30, the inductive energy stored in the phase windings 12a–12c upon deenergization is directed via the diodes 40, 42 and 44 to an energy catch network comprising the capacitor 46 and the resistor 48. Energy directed to the network upon deenergization of a given phase winding is stored in the capacitor 46 and subsequently returned to another phase winding in its energization period. The drain-to-source voltage drop across each power transistor 28, 30, 32 is detected by a respective R-C network 50, 52, 54 to provide an electrical indication on lines 56, 58 and 60 of the current conducted through the respective transistors.

A pulse-width-modulated signal such as designated by the reference numeral 70 is externally developed and applied to the input terminal 72 as an indication of the desired motor speed. The duty cycle of the signal (% DC), and therefore the average input voltage is directly proportional to the desired speed ($N_{des}$), as shown in the graph designated by the reference numeral 74. Duty cycles ranging from 0% to 95% correspond to desired motor speeds ranging from a minimum speed (MIN) to a maximum speed (MAX). A duty cycle of 95% or greater corresponds to a desired motor speed of zero. Alternatively, the desired speed signal may be generated by a voltage source or by a variable resistance to ground, provided that a direct relationship between the voltage or resistance and the desired speed is maintained.

In any event, the desired speed signal is applied to the line 76 via the resistor 78, and is used, as will later be described, to modulate the conduction of the power transistors 28–32 so that the actual motor speed $N_{act}$ corresponds with the desired speed $N_{des}$.

A further externally developed bipolar electrical signal is applied to line 80 via the input terminal 82 to provide an indication of the desired motor direction. As will later be explained, this signal is effective to reverse the energization sequence of the phase windings 12a–12c.

The logic circuit 84 is a custom gate array device used to implement various circuit elements for controlling the conduction of power transistors 28–32. The primary circuit elements of logic circuit 84 are set forth in FIG. 2, and certain of such circuit elements are set forth in further detail in FIGS. 3–5. The inputs to logic circuit 84 include the desired speed and direction information on lines 76 and 80, the rotor position information on lines 20–24, and the transistor current information on lines 56–60.

Figure 2:
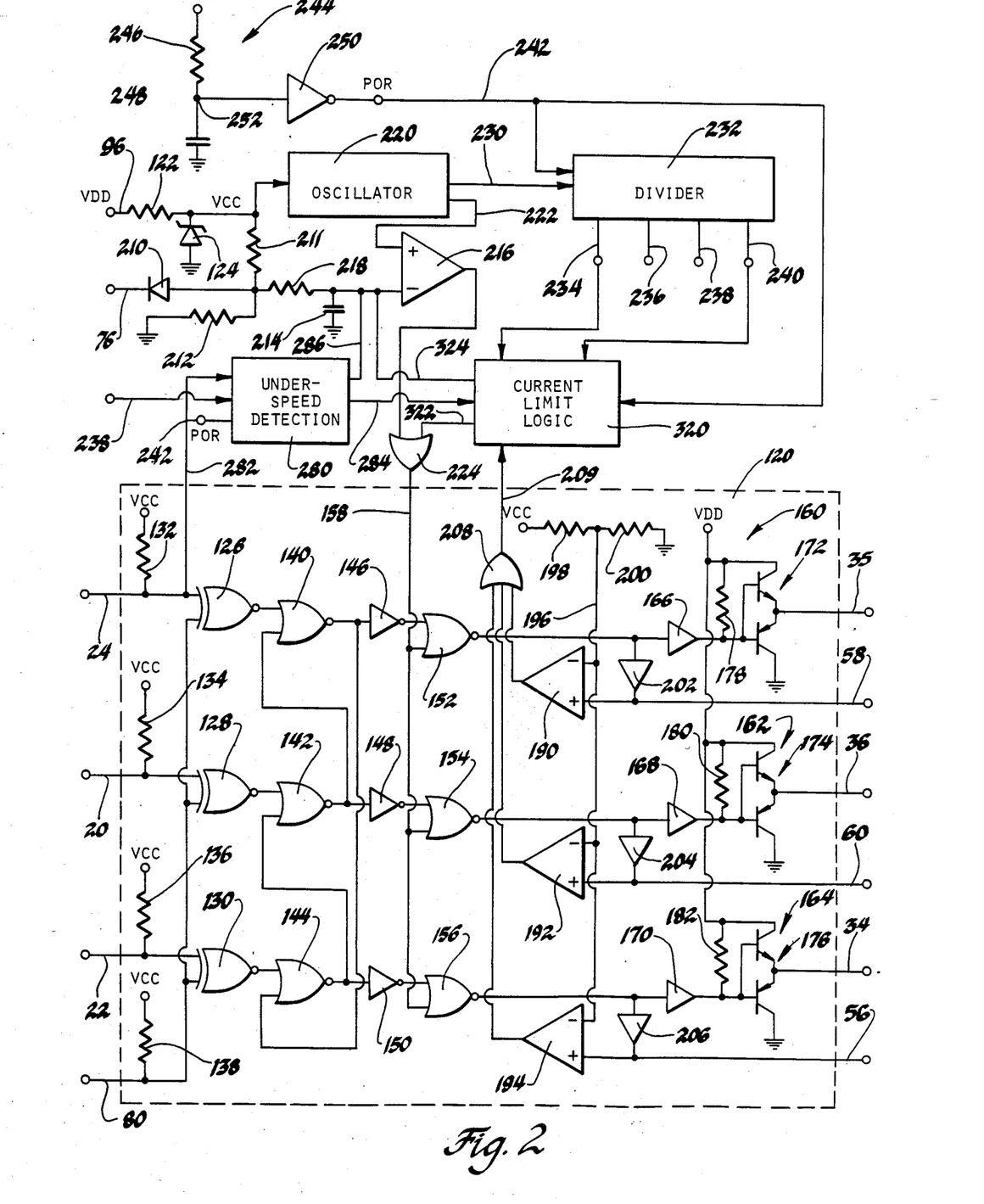

In response to the various inputs, the logic circuit 84 outputs conduction control signals to the power transistors 28-32 via the lines 34-36.

The storage battery 26 supplies power to the logic circuit 84 directly via a filter and wake-up circuit, designated generally by the reference numeral 86. The battery 26 supplies power to other electrical loads, designated by the resistor 88, via the ignition switch 90. The filter and wake-up circuit 86 operates to filter the battery voltage and to prevent substantial discharging of the battery 26 when motor operation is not required. Capacitor 92 filters the battery voltage, and PNP transistor 94 is effective when rendered conductive to apply the filtered battery voltage to the logic circuit 84 on line 96 via the series resistor 98 and the shunt Zener diode 100 and capacitor 102. The conduction of transistor 94 is controlled by an R-C network comprising the capacitor 104 and the resistors 106-110. The series resistors 106 and 108 connect the base of transistor 94 to the desired speed signal at terminal 72 and the capacitor 104 is connected between the resistor junction 112 and the junction 114. The resistor 110 is connected across the base-emitter junction of transistor 94.

In operation, the resistor 110 helps maintain the transistor 94 in its normally nonconductive state, isolating battery voltage from the logic circuit 84. In such state, the drain on the battery 26 is limited primarily to the leakage current of transistor 94—about 400 uA. Whenever the desired speed input signal at terminal 72 is at a logic zero voltage potential, the capacitor 104 is charged through the battery 26 and the resistor 108. When the capacitor 104 is sufficiently charged, the base-emitter junction of transistor 94 becomes forward biased, and the filtered battery voltage is applied to the logic circuit 84. The capacitor 104 and resistors 106-110 are sized such that the transistor 94 is forward biased whenever the duty cycle of the signal applied to input terminal 72 is less than approximately 95%. When the duty cycle of the signal exceeds approximately 95%, indicating that the desired speed is zero, the capacitor 104 discharges through the base-emitter junction of transistor 94, and the resistors 106 and 110 and thereafter, the transistor ceases to conduct.

As indicated above, FIG. 2 sets forth the logic circuit 84 of FIG. 1 in greater detail. Accordingly, the input and output lines are in the same order as in FIG. 1 and have been assigned the same reference numerals. Essentially, the logic circuit 84 comprises a motor drive circuit 120 which energizes the phase windings 12a-12c in accordance with the rotor position information on lines 20-24 and the desired direction information on line 80, and various other elements and circuits which modulate the phase winding energization so as to control the motor speed and to protect the power transistors 28-32 during overcurrent conditions. The input battery voltage is referred to in FIGS. 2-5 as $V_{DD}$, and a lower voltage used by various circuits is referred to as $V_{CC}$. The voltage $V_{CC}$ is obtained from $V_{DD}$ with a simple voltage regulator comprising a series resistor 122 and a shunt Zener diode 124, as shown.

Referring to the motor drive circuit 120, the rotor position signals on lines 20-24 are connected as inputs to the exclusive NOR gates 126-130, the other input of each such gate being connected to the desired direction signal on line 80. Pull-up resistors 132-138 connect the lines 20-24 and 80 to the voltage $V_{CC}$ to normally maintain the respective signals at a logic one voltage potential. The outputs of the exclusive NOR gates 126-130 are connected to the input of a ring counter comprising the NOR gates 140-144. The outputs of the ring counter are connected through the inverters 146-150 as inputs to the NOR gates 152-156, the other input of each such gate being connected to the modulation signal line 158. The outputs of the NOR gates 152-156 are connected, in turn, to the power transistor driver circuits 160-164 through open-collector gates 166-170.

The driver circuits 160-164 are identical; each comprises a pair of totem-connected transistors 172-176 normally biased by the gates 166-170 to prevent conduction of the respective power transistor. When the output of a NOR gate 152-156 assumes a logic one voltage potential, the respective gate 166-170 reverts to an open-collector state, and a pull-up resistor 178-182 biases the respective driver circuit 160-164 to drive the respective power transistors 28-32 into conduction for energizing a phase winding.

Included within the motor drive circuit 120, but logically separate therefrom, are the comparators 190, 192 and 194. Essentially, the comparators 190-194 compare the power transistor drain-to-source voltage drop signals on lines 56-60 with a reference voltage defined on line 196 by the voltage divider resistors 198 and 200. The open collector gates 202-206 ensure that the voltage signals are maintained low when the respective power transistor 28-32 is biased nonconductive. Normally, the drain-to-source voltage drop is less than the reference voltage, and the comparator outputs assume a logic zero voltage level. However, if the current conducted through the drain-to-source junction of a given power transistor exceeds a maximum safe operating level, drain-to-source voltage drop will exceed the reference voltage on line 196 and the output of the respective comparator 190-194 will assume a logic one voltage potential. The outputs of the comparators 190-194 are connected as inputs to the OR gate 208 so that if the current conducted through one or more of the power transistors 28-32 is above a safe maximum operating level, the output of OR gate 208 on line 209 rises to a logic one voltage potential.

As indicated above, the modulation signal on line 158 is used to modulate the normal energization of the phase windings 12a-12c for the purpose of speed control and power transistor protection during overcurrent conditions. When the motor is running at normal operating speeds, and the power transistors are operating at a safe current level, the state or duty cycle of the modulation signal is controlled in response to the desired speed signal on line 76. The desired speed signal is applied through a diode 210 and a voltage divider comprising the resistors 211 and 212 to the inverting input of a comparator 216. A filter capacitor 214 is connected between the noninverting input and ground. The diode 210 provides isolation, and the resistor 218 provides controlled acceleration time. The noninverting input of the comparator 216 is connected to a 20 kHz triangular voltage signal generated by oscillator circuit 220 on line 222, the oscillator circuit 220 being shown in greater detail in FIG. 3. Accordingly, the output of the comparator 216 is modulated on and off at a rate which is proportional to the duty cycle of the desired speed signal on line 76. The output of comparator 216 is applied to the modulation signal line 158 through the OR gate 224 so as to likewise modulate the phase winding energization.

For the most part, the controller as described above broadly comprises a conventional open-loop speed control system for a brushless DC motor. The motor phase windings are energized in sequence in response to sensed rotor position, and the energization is modulated on and off at a relatively high frequency in accordance with the desired speed signal. When the desired speed is relatively high, the duty cycle of the phase winding energization is relatively high, but no more than 95%, to produce relatively high torque. When the desired speed is relatively low, the duty cycle of the phase winding energization is relatively low to produce relatively low torque.

The remainder of the circuitry to be described is directed primarily to the advantageous control aspects of this invention—that is, ensuring reliable motor starting even when the desired motor speed is relatively low, and extending the low speed operating range of the motor. These control aspects are achieved by effecting an override of the normal modulation of the phase winding energization whenever it is determined that the motor speed is lower than a relatively low speed threshold. The override works hand-in-hand with an overcurrent protection circuit to ensure reliable motor starting while protecting the controller.

For timing purposes, the oscillator 220 generates a 20 kHz digital clock signal on line 230, and a divider 232 generates therefrom several lower frequency digital clock signals (2500 Hz, 1250 Hz, 4.88 Hz, and 1.22 Hz) on the lines 234–240 as indicated. A Power-On-Reset (POR) signal is applied to the divider 232 via the line 242, such signal being effective to identify each reapplication of power to the logic circuit 84. The POR signal is generated by the circuit 244 which comprises a series resistor 246 and capacitor 248 connected between $V_{CC}$ and ground potential, and an inverter 250 connected to the junction 252. Whenever power is reapplied to the logic circuit 84, the POR signal on line 242 experiences a high-to-low logic voltage transition.

Figure 3:
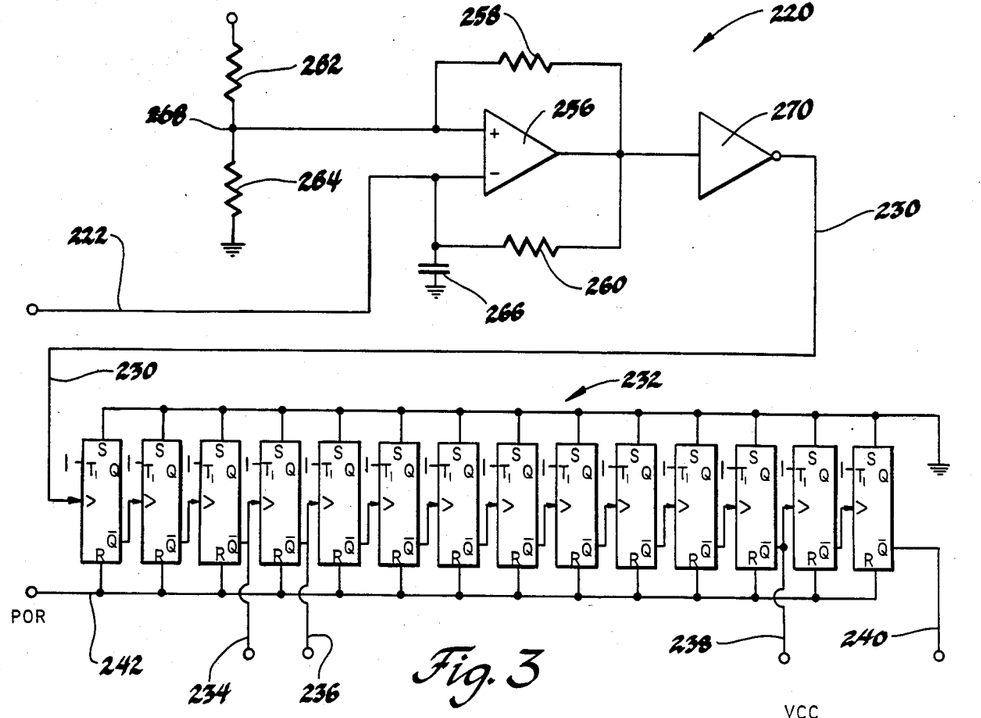
FIGS. 3–5 depict certain of the functional blocks shown in FIG. 2 in more detail.

The divider 232 and oscillator 220 are shown together in greater detail in FIG. 3, where the reference numerals used in FIG. 2 have been appropriately repeated. The oscillator 220 is of the R-C type, and comprises a comparator 256, feedback resistors 258–260, reference divider resistors 262–264, and a capacitor 266. So long as the reference voltage at the divider junction 268 is greater than the capacitor voltage, the comparator 256 charges the capacitor 266 through resistor 260. When the capacitor voltage exceeds the reference, the comparator 256 discharges the capacitor 266 through resistor 260. As a result, a triangular waveform is generated on line 222 and a like frequency square waveform is generated at the comparator output. The components are chosen such that both waveforms have an oscillation frequency of approximately 20 kHz. The triangular waveform on line 222 is applied to the comparator 216 as described above in reference to FIG. 2, and the square waveform is applied through the inverter 270 to the divider input line 230.

The divider 232 comprises a series of flip-flops, each of which divides its input frequency by a factor of two. Thus, the line 234 carries a 2500 Hz clock signal, the line 236 carries a 1250 Hz clock signal, the line 238 carries a 4.88 Hz clock signal, and the line 240 carries a 1.22 Hz clock signal. The POR signal on line 242 operates to reset the divider at each reapplication of power to the logic circuit 84.

Referring again to FIG. 2, an underspeed detection circuit 280 is effective to sense the motor speed and compare it with a relatively low reference speed. The actual motor speed information is obtained via line 282 from the $H_c$ position sensor output on line 24; the reference motor speed is defined by the 4.88 Hz clock signal on line 238. As with the divider 232, the POR signal on line 242 is applied as an input to ensure repeatable operation each time power is reapplied to the logic circuit 84. So long as the actual motor speed exceeds the reference speed, the circuit 280 is passive. However, when the actual motor speed is less than the reference speed, the output line 284 becomes active to indicate the presence of an underspeed condition (due to starting or stall), and the output line 286 becomes active to override the desired speed signal by changing the voltage across the filter capacitor 214. When the underspeed condition lapses, the circuit 280 becomes passive once again.

Figure 4:
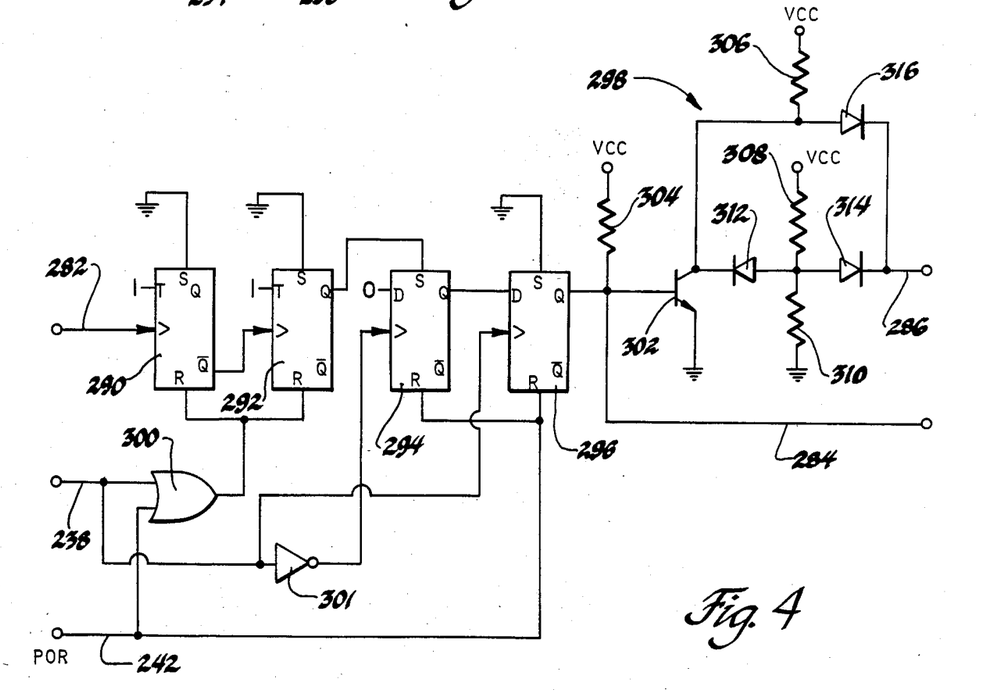

The underspeed detection circuit 280 is depicted in greater detail in FIG. 4, where the reference numerals used in FIG. 2 have been repeated as appropriate. The circuit 280 includes a two-stage input counter comprising the flip-flops 290–292 receiving the rotor position information on line 282, a temporary status register comprising the flip-flop 294, and an underspeed status register comprising the flip-flop 296. The output of flip-flop 296 is connected directly to the output line 284, and through the override circuit 298 to the output line 286. The 4.88 Hz clock signal on line 238 is applied through OR gate 300 to the reset inputs of the counter flip-flops 290–292 and is used to clock the flip-flop 296 directly and the flip-flop 294 through the inverter 301. The POR signal on line 242 serves to reset the flip-flops 290–296 at each reapplication of power to the logic circuit 84. The input counter operates to digitally compare the clock signal on line 238 with the rotor position signal on line 282. In such comparison, the 4.88 Hz clock signal defines a reference speed of approximately 400 RPM.

If the actual motor speed exceeds the reference speed defined by the 4.88 Hz clock signal, the input counter successively accumulates rotor position pulses. On the third such pulse, the flip-flop 294 is set to a logic one. On the next pulse of the clock signal, the logic one at the output of flip-flop 294 will be transferred to the output of the flip-flop 296. In such case, the output line 284 is at a logic one voltage potential, indicating that the motor speed is in excess of the reference speed. In addition, the transistor 302 of override circuit 298 is rendered conductive by the pull-up resistor 304, and operates to effectively open-circuit the output line 286.

If the actual motor speed is less than the reference speed defined by the 4.88 Hz clock signal, the clock signal will reset the flip-flops 290–292 before the third pulse of the rotor position signal. In succeeding pulses of the clock signal, the logic zero on the data (D) input of flip-flop 294 will be transferred to the output of flip-flop 296. In such case, the output line 284 is at a logic zero voltage potential indicating that the motor speed is less than the reference speed. In addition, the transistor 302 is biased nonconductive, thereby permitting the resistor 306 and the divider resistors 308–310 to charge the filter capacitor 214 via output line 286. The resistors 306–310 are sized such that the filter capacitor 214 is quickly charged to a first potential by the divider for adjusting the modulation duty cycle to approximately 40%, and then further charged at a progressive rate by the resistor 306 for further increasing the modulation duty cycle. The duty cycle of 40% corresponds to a motor speed of approximately 1200 RPM. The diodes 312–316 provide isolation between the divider and the resistor 306.

Referring again to FIG. 2, a current limit circuit 320 is effective in the event of an overcurrent condition (as indicated by the output of OR gate 208 on line 209) to override the comparator 216 via output line 322 and the NOR gate 224 and intermittently interrupt the energization of the motor phase windings. If the overcurrent condition persists, the current limit circuit 320 either limits the motor speed or shuts the motor off entirely, depending on the motor speed at the time the persistent overcurrent condition is indicated.

If the motor speed is greater than the reference speed of approximately 400 RPM (as determined by the underspeed detection circuit 280), the filter capacitor 214 is indefinitely clamped via output line 324 to a voltage that modulates the motor phase windings so as to limit the motor speed to a relatively low speed such as 1800 RPM. If the overcurrent condition persists despite the speed limit, the capacitor 214 is discharged to deenergize the phase windings 12a–12c until a Power-On-Reset (POR) occurs.

If the motor speed is less than the reference speed of approximately 400 RPM, the rotor is assumed to be stalled, and the capacitor is discharged to deenergize the phase windings 12a–12c for a cooling interval before restarting is attempted. Further unsuccessful attempts at starting the motor result in the motor being deenergized until a Power-On-Reset (POR) occurs. The various intervals are defined by the clock signal outputs of divider 232 on lines 234 and 240.

Figure 5:
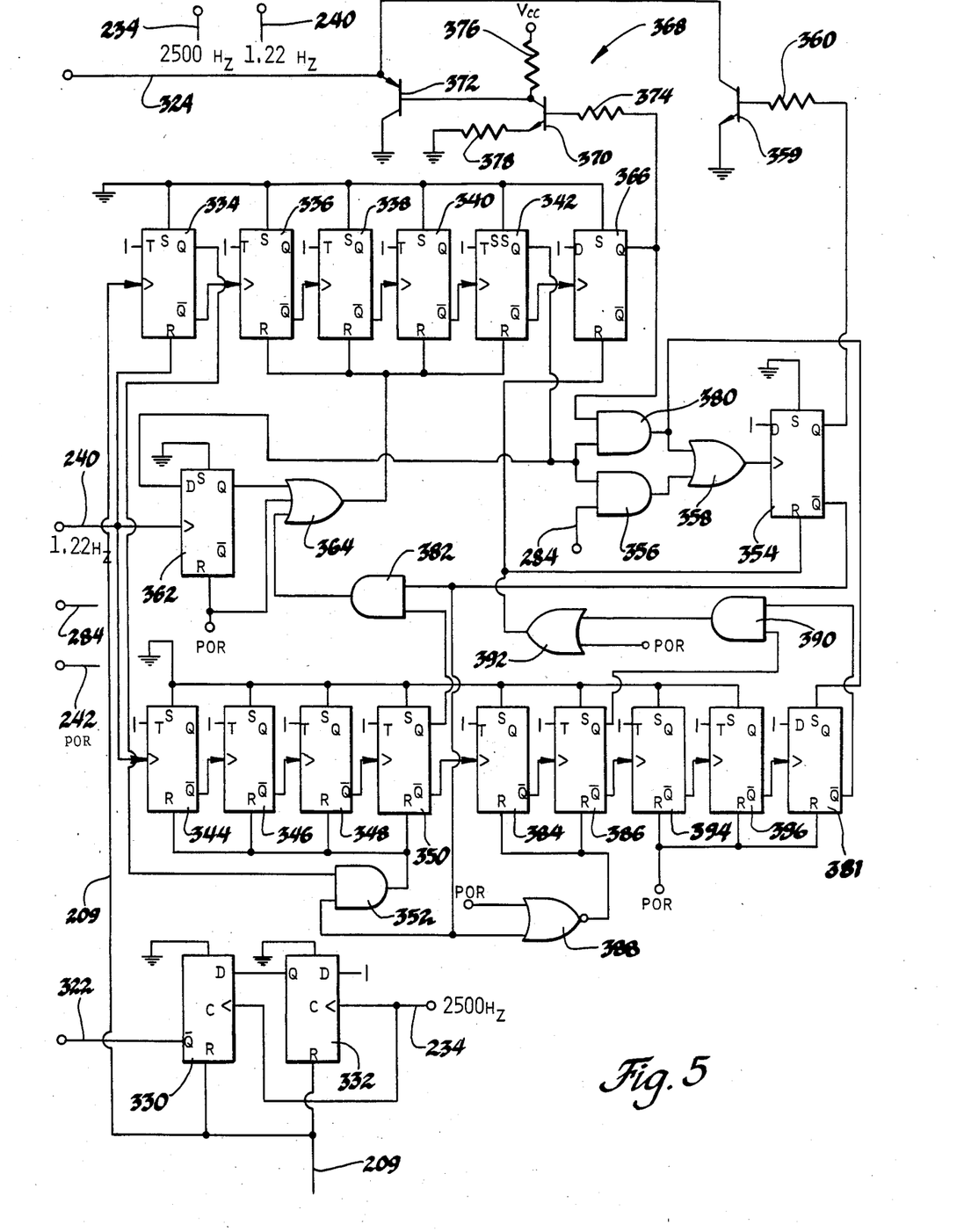

The current limit circuit 320 is depicted in greater detail in FIG. 5, where the reference numerals used in FIG. 2 have been repeated as appropriate. The intermittent energization interruption effected in response to a sensed overcurrent condition is mechanized by the flip-flops 330–332 through the output line 322. The output line 322 is normally held at a logic zero voltage potential due to the logic one at the data (D) input of flip-flop 332. However, when the signal on line 209 indicates an overcurrent condition, the flip-flops 330–332 are reset, toggling the output line 322 to a logic one to disable the motor drive circuit 120 through OR gate 224 for an interval of approximately 40 μsec, as determined by the 2500 Hz clock signal on line 234. The motor drive circuit 120 is intermittently disabled in this manner at each indication of an overcurrent condition by the signal on line 209.

The current limit circuit 320 includes circuitry, as indicated above, to effect further interruptions of the phase winding energization if an overcurrent condition persists in spite of the action effected by the flip-flops 330–332. To this end, the signal on line 209 is additionally connected to the clock input of a current limit status register comprising the flip-flop 334. The flip-flop 334 is periodically reset by the 1.22 Hz clock signal on line 240. So long as the current limit signal is pulsed prior to the periodic reset effected by the 1.22 Hz clock signal, the Q-not output of flip-flop 334 increments a four-stage current limit counter comprising the flip-flops 336–342.

If the current limit signal occurs during the periodic reset effected by the clock signal, the clock signal on line 240 increments a noncurrent limit counter comprising the flip-flops 344–350. So long as the current limit condition persists, the Q output of the flip-flop 334 operates through the AND gate 352 to reset the noncurrent limit counter, provided the motor is running. This condition is determined by the state of a motor status flip-flop 354, the Q-not output of which is connected to the other input of AND gate 352.

If the overcurrent condition results in the current limit counter being incremented eight (8) successive times, its Q output (the Q output of flip-flop 342) assumes a logic one voltage potential, indicating that an overcurrent condition has persisted for an interval of approximately 6.5 seconds. In such event, the AND gate 356 is effective to determine if the persistent overcurrent condition coincides with a motor speed of less than approximately 400 RPM, as determined by the underspeed signal from underspeed detection circuit 280 on line 284. If so, its output assumes a logic one voltage potential and clocks the motor status flip-flop 354 to a "motor off" state (Q output high) through the OR gate 358 to indicate that the motor 10 should be turned off. In this event, the transistor 359 is rendered conductive through the resistor 360, thereby discharging the filter capacitor 214 through line 324, and forcing deenergization of the motor phase windings 12a–12c.

In addition, the Q output of the current limit counter is connected to the data (D) input of a counter reset flip-flop 362, and such flip-flop is effective upon a subsequent pulse of the 1.22 Hz clock signal to reset the current limit counter through the OR gate 364. At such point, the Q-not output of the current limit counter clocks the flip-flop 366 high to activate a clamp circuit 368 which attempts to override the desired motor speed signal and make the motor 10 run at a predetermined speed of 1800 RPM. The clamp circuit 368, which itself may be overridden by the transistor 359, comprises a pair of transistors 370–372 which are rendered conductive by the Q output of flip-flop 366 through the resistor 374 to maintain a predetermined voltage on the filter capacitor 214 through the line 324. The resistors 376–378 form a divider which defines the predetermined voltage.

The AND gate 380 operates to independently clock the flip-flop 354 to the "motor off" state through the OR gate 358 and to set a motor restart latch 381 if the current limit counter indicates another 6.5 seconds of current limiting has occurred while attempting to operate at the reduced speed of 1800 RPM. The motor restart latch 381 indicates when set that motor restarting is not allowed.

If the overcurrent signal on line 209 indicates that the power transistors 28–32 are operating within safe limits, the noncurrent limit counter is incremented by the 1.22 Hz clock signal as described above. After approximately 6.5 seconds of noncurrent limiting operation have occurred, the Q output of the counter will become high, causing the current limit counter to be reset through the AND gate 382 and the OR gate 364, provided the flip-flop 354 indicates that motor 10 is still on.

While the motor status flip-flop 354 is in the "motor on" state, the serially connected flip-flops 384–386 are maintained in a reset condition via the OR gate 388. However, when the flip-flop 354 is in the "motor off" state, the flip-flops 384–386 extend the noncurrent limit counter into a six-stage 26 second timer which indicates if the motor 10 has been off for a 26 second interval. In such case, the motor status flip-flop 354 is reset to the "motor on" state through AND gate 390 and OR gate 392 to enable restarting, providing the motor restart latch 381 has not been set by AND gate 380. In addition, a motor restart counter comprising the flip-flops 394–396 is incremented to count the number of attempted restarts. After four restarts have been attempted, the output of the motor restart counter effectively sets the motor restart latch 381 to prevent further restarts. At such point, further restarting can be attempted only after the POR signal on line 242 indicates a reapplication of power to the logic circuit 84.

The functions performed by the current limit circuit 320 will now be reviewed with reference to FIG. 5. As soon as an overcurrent condition is indicated, the motor drive circuit 120 is intermittently disabled by the flip-flops 330–332 to effect a reduction in the phase winding energization. This can occur for one to two seconds during the starting of the motor when the underspeed detection circuit commands a relatively high energization duty cycle and there is little or no induced-EMF to oppose the applied-EMF. As the motor speed increases, the induced-EMF builds up, and the overcurrent condition is alleviated. However, overcurrent conditions may occur for other reasons, such as unusually high temperature, a motor bearing failure, or an obstruction of the motor rotor. In such cases, further steps may be required to protect the controller.

The current limit counter is effective to detect the occurrence of a persistent overcurrent condition which is not corrected by the operation of flip-flops 330–332. When this condition is detected (6.5 seconds of current limit operation), the response of the current limit circuit depends on whether the motor speed is above or below the reference speed of 400 RPM. If the motor speed is below 400 RPM, the rotor is likely stalled, and the motor is turned off for a 26 second interval (as timed by the flip-flops 344–350 and 384–386). At the end of such interval, the motor restart counter is clocked, and the motor is enabled to start as though there had been no overcurrent condition. However, when the motor restart counter has been clocked four times in a period of intended motor operation, the motor restart latch 381 is clocked high to prevent further restarting attempts until the occurrence of a Power-On-Reset. If the motor speed is above 400 RPM when a persistent overcurrent condition is identified, it is likely that the problem is temperature related, and there is a chance that it can be cured by operating at a reduced power level. In such event, the circuit 368 effects an override of the desired speed signal and/or the underspeed detection circuit 280, and imposes an open-loop energization duty cycle on motor drive circuit 120 for driving the motor 10 at a relatively low speed such as 1800 RPM.

If the override speed control (1800 RPM) is effective to alleviate the overcurrent condition before the current limit counter can count another 6.5 second interval, the motor is permitted to continue running, but the speed control is maintained until the occurrence of a Power-On-Reset. A 6.5 second interval of safe operation (as detected by the noncurrent limit counter) is effective to reset the current limit counter.

If, on the other hand, the overcurrent condition persists for a 6.5 second interval despite the override speed control of 1800 RPM, the motor is deenergized, and the motor restart latch 381 is set to prevent restarting until the occurrence of a Power-On-Reset.

In summary, this invention provides improved operation for an open-loop brushless motor speed controller. Reliable motor starting is ensured, even at relatively low desired motor speeds, by the underspeed detection circuit 280 which effects an override of the desired speed signal whenever the motor speed is below the reference speed of 400 RPM. The override results in an effective initial speed command of approximately 1200 RPM, which is progressively increased toward the maximum speed command until the actual motor speed exceeds the 400 RPM reference. In addition to providing reliable motor starting, the override extends the useful speed range of the motor by permitting lower desired speeds than would otherwise be allowed because of starting problems. The relatively quick start occasioned by the override may be beneficial, particularly when the motor speed is manually controlled, since there is nearly instant feedback to the operator that the motor (or motor driven load) is responding to a command.

The current limit circuit 320 works hand-in-hand with the underspeed detection override by limiting the motor current to safe operating levels during starting, when the induced-EMF is relatively low. The typical overcurrent conditions caused by the desired speed signal override during motor starting are alleviated by modulating or intermittently disabling the motor drive circuit 120. More serious overcurrent conditions, as due to rotor obstruction or overheating result in motor shut down or an override (1800 RPM) of the underspeed detection override. In any event, the motor control reverts to normal operation each time power is reapplied to the logic circuit 84.

While this invention has been described in reference to the illustrated embodiment, it will be recognized that various modifications thereto will occur to those skilled in the art and that controllers incorporating such modifications may be included within the scope of this invention, which is defined by the appended claims.

The embodiments of the invention in which an exclusive property or privilege is claimed are defined as follows:

1. A brushless DC motor speed controller of the open-loop type which modulates the energization of the motor windings at a level determined in accordance with an input signal representative of the desired motor speed value so as to operate the motor speed at the desired speed value, the improvement comprising:
   means for detecting the actual motor speed relative to a reference motor speed indicative of a relatively low running speed of the motor;
   means for overriding the input signal when it is detected that the actual motor speed is less than the reference speed such that the controller modulates the energization of the motor windings at a level for operating the motor at relatively high motor speed to thereby effect a rapid increase in the motor speed beyond the reference motor speed, independent of the input signal; and
   means for disabling the input signal override when it is detected that the actual motor speed is greater than the reference motor speed so that the modulation of the motor winding energization, and therefore the motor speed, is once again determined in accordance with the input signal.

2. A controller as set forth in claim 1, wherein the input signal override causes the motor winding energization to be initially modulated at a level for operating the motor at a moderate speed and thereafter at progressively higher speeds up to a maximum speed until the input signal override is disabled.

3. A brushless DC motor controller of the open-loop type which modulates the energization of the motor windings at a duty cycle determined in accordance with an input signal representative of the desired motor speed value so as to operate the motor speed at the desired speed value, the improvement comprising:

means for overriding the input signal when the actual motor speed is less than a reference speed indicative of a relatively low running speed of the motor such that the controller modulates the current supplied to the motor windings at a duty cycle for operating the motor at a relatively high motor speed to thereby effect a rapid increase in the motor speed beyond the reference motor speed, independent of the input signal;

means for detecting the presence of an overcurrent condition when the current supplied to the motor windings exceeds a safe operating level; and current limit means effective when an overcurrent condition is detected to intermittently interrupt the supply of current to the motor windings for a predetermined interval independent of the input signal override to thereby protect the controller while the motor is accelerating toward the reference speed.

4. The improvement as set forth in claim 3, including:

means operative when the intermittent interruptions of current effected by the current limit means does not alleviate the indication of an overcurrent condition for effecting a continuous interruption of the current supply independent of the input signal override to thereby protect the controller in the event the controller is unable to accelerate the motor beyond the reference speed.

* * * * *